United States Patent
Iwaya et al.

(10) Patent No.: US 9,758,045 B2
(45) Date of Patent: Sep. 12, 2017

(54) TRAVELABLE DISTANCE CALCULATION APPARATUS

(71) Applicants: MITSUBISHI JIDOSHA KOGYO KABUSHIKI KAISHA, Tokyo (JP); MITSUBISHI JIDOSHA ENGINEERING KABUSHIKI KAISHA, Okazaki-shi, Aichi (JP)

(72) Inventors: Norifumi Iwaya, Tokyo (JP); Tadashi Naruse, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Aichi (JP)

( * ) Notice: Subject to any disclaimer, the term of this patent is extended or adjusted under 35 U.S.C. 154(b) by 0 days.

(21) Appl. No.: 14/991,615

(22) Filed: Jan. 8, 2016

(65) Prior Publication Data

US 2016/0121724 A1    May 5, 2016

Related U.S. Application Data

(63) Continuation of application No. PCT/JP2014/068621, filed on Jul. 11, 2014.

(30) Foreign Application Priority Data

Jul. 11, 2013  (JP) ................................. 2013-145871

(51) Int. Cl.
 *B60L 3/12*     (2006.01)
 *B60K 6/52*     (2007.10)
 (Continued)

(52) U.S. Cl.
 CPC  *B60L 3/12* (2013.01); *B60C 9/00* (2013.01); *B60K 6/442* (2013.01); *B60K 6/52* (2013.01);
 (Continued)

(58) Field of Classification Search
 CPC ........................................................ B60L 3/12
 See application file for complete search history.

(56) References Cited

U.S. PATENT DOCUMENTS 4,046,998 A * 9/1977 Kuno ...................... G01F 9/001
                                                              377/24
4,625,284 A * 11/1986 Suzuki ................ G01F 23/0069
                                                              702/55
(Continued)

FOREIGN PATENT DOCUMENTS

CN        101424558 A      5/2009
EP        2 196 370 A1     6/2010
(Continued)

OTHER PUBLICATIONS

Extended European Search Report dated May 10, 2017 issued in corresponding European Patent Application No. 14823759.7.
(Continued)

*Primary Examiner* — Adam Tissot
*Assistant Examiner* — Michael Berns
(74) *Attorney, Agent, or Firm* — Birch Stewart Kolasch & Birch, LLP (57) ABSTRACT

A travelable distance calculation apparatus comprises: an update device 72 for recording a measured remaining fuel amount value, and also sequentially updating the recorded value; a calculation device 73 for calculating a travelable distance based on the remaining capacity of a battery and the recorded value; and a display device 80 for displaying at least the travelable distance. During a period when an engine 13 is stopped, the update device 72 holds, as the recorded value, a value recorded during operation of the engine 13.

16 Claims, 4 Drawing Sheets

(51) Int. Cl.
| | |
|---|---|
| B60K 35/00 | (2006.01) |
| B60L 3/00 | (2006.01) |
| B60W 20/00 | (2016.01) |
| B60K 6/442 | (2007.10) |
| B60K 17/356 | (2006.01) |
| B60L 11/18 | (2006.01) |
| B60C 9/00 | (2006.01) |
| G01F 9/00 | (2006.01) |
| B60W 50/14 | (2012.01) |
| B60K 1/00 | (2006.01) |
| B60K 15/03 | (2006.01) |

(52) U.S. Cl.
CPC ............ *B60K 17/356* (2013.01); *B60K 35/00* (2013.01); *B60L 3/00* (2013.01); *B60L 11/18* (2013.01); *B60W 20/00* (2013.01); *B60W 50/14* (2013.01); *G01F 9/001* (2013.01); *B60K 2001/001* (2013.01); *B60K 2015/03217* (2013.01); *B60K 2350/1076* (2013.01); *B60W 2510/244* (2013.01); *B60W 2530/14* (2013.01); *B60W 2560/02* (2013.01); *Y02T 10/6234* (2013.01); *Y02T 10/6265* (2013.01)

(56) References Cited

U.S. PATENT DOCUMENTS

| | | | | |
|---|---|---|---|---|
| 4,912,646 | A | * | 3/1990 | Cerruti .............. G01F 23/0076 340/450.2 |
| 5,826,459 | A | * | 10/1998 | Kataoka ............... G01F 23/36 73/1.73 |
| 8,260,534 | B2 | * | 9/2012 | Henderson ......... G01C 21/3697 340/439 |
| 8,930,125 | B2 | * | 1/2015 | Fasse .................... B60L 3/0046 180/65.21 |
| 2002/0032540 | A1 | * | 3/2002 | Sadahiro ................ G01F 9/008 702/149 |
| 2011/0046834 | A1 | * | 2/2011 | Grider .................. B60W 10/06 701/22 |
| 2011/0196600 | A1 | | 8/2011 | Henderson et al. |
| 2011/0241859 | A1 | | 10/2011 | Handa |
| 2012/0179313 | A1 | | 7/2012 | Hartl et al. |
| 2014/0077941 | A1 | | 3/2014 | Yamamura et al. |
| 2016/0063771 | A1 | * | 3/2016 | Meyer .................... G07C 5/004 701/123 |
| 2016/0167643 | A1 | * | 6/2016 | Tabanoglu ............ B60W 20/00 701/22 |

FOREIGN PATENT DOCUMENTS

| | | |
|---|---|---|
| JP | 4-32721 A | 2/1992 |
| JP | 11-220803 A | 8/1999 |
| JP | 2005-77183 A | 3/2005 |
| JP | 2008-247081 A | 10/2008 |
| JP | 2010-112886 A | 5/2010 |
| JP | 2011-218868 A | 11/2011 |
| JP | 2013-27166 A | 2/2013 |
| WO | WO 2012/153395 A1 | 11/2012 |

OTHER PUBLICATIONS

Office Action dated Apr. 5, 2017 in corresponding Chinese Patent Application 201480039044.3 with a English Translation.

* cited by examiner

TRAVELABLE DISTANCE CALCULATION APPARATUS

This application is a Continuation of PCT International Application No. PCT/JP2014/068621, filed on Jul. 11, 2014, which claims priority under 35 U.S.C. 119(a) to Patent Application No. 2013-145871, filed in Japan on Jul. 11, 2013, all of which are hereby expressly incorporated by reference into the present application.

TECHNICAL FIELD

This invention relates to a travelable distance calculation apparatus which calculates the travelable distance, the remaining fuel amount, etc. of a hybrid vehicle equipped with a travel motor and an engine.

BACKGROUND ART

In recent years, hybrid vehicles equipped with a travel motor and an engine have found practical use. Among hybrid vehicles is one equipped with a device for displaying a distance travelable from now on, a remaining fuel amount, and so on. An example of the above device is configured to calculate and display the travelable distance based on the residual capacity of a battery for supplying electric power to the travel motor, and the remaining amount of fuel within a fuel tank (see, for example, Patent Document 1).

PRIOR ART DOCUMENTS

Patent Documents

Patent Document 1: JP-A-Hei-11-220803

SUMMARY OF THE INVENTION

Problems to be Solved by the Invention

The remaining amount of fuel within the fuel tank is measured, for example, with a fuel gauge (sender gauge). The fuel gauge generally measures the remaining fuel amount based on a change in the resistance value according to the position (height) of a float. Depending on the traveling state of the vehicle, therefore, the error between the remaining fuel amount measured by the fuel gauge and the actual remaining fuel amount may be great.

In the case of a hybrid vehicle which can travel electrically without using fuel, for example, the remaining fuel amount measured by the fuel gauge may fluctuate owing to fuel oscillation, although there is no fuel consumption because of an electrically operated travel. In association with such fluctuations in the remaining fuel amount, displays of the travelable distance, for example, may change, giving a user a sense of incongruity.

The present invention has been accomplished in the light of the above circumstances. It is an object of the invention to provide a travelable distance calculation apparatus which can appropriately calculate the travelable distance in order to display it without causing any sense of incongruity to the user.

Means for Solving the Problems

A first aspect of the present invention, for solving the above problems, is a travelable distance calculation apparatus loaded on a hybrid vehicle equipped with a travel motor, an engine, and a battery for supplying electric power to the travel motor, the travelable distance calculation apparatus comprising: a measuring device that measures a remaining fuel amount based on the position of the liquid surface of fuel within a fuel tank provided in the hybrid vehicle; an update device that records the remaining fuel amount measured by the measuring device, and also sequentially updating a recorded value thereof; a calculation device that calculates a travelable distance based on the remaining capacity of the battery and the recorded value; and a display device that displays the travelable distance calculated by the calculation device, wherein the update device holds a value updated finally during the operation of the engine, as the recorded value, during a period when the engine is stopped.

A second aspect of the present invention is the travelable distance calculation apparatus according to the first aspect, wherein the display device displays the recorded value as the remaining fuel amount, together with the travelable distance, and displays the value updated finally, as the remaining fuel amount, during the period when the engine is stopped.

A third aspect of the present invention is the travelable distance calculation apparatus according to the first or second aspect, further comprising a correction device that calculates a corrected remaining fuel amount value by filtering a measured remaining fuel amount value which is the remaining fuel amount measured by the measuring device, wherein the update device records the corrected remaining fuel amount value as the remaining fuel amount, and also sequentially updates the recorded value.

A fourth aspect of the present invention is the travelable distance calculation apparatus according to the third aspect, further comprising a determination device that determines whether or not a variance value between the measured remaining fuel amount value and the recorded value is greater than a predetermined value, during the period when the engine is stopped, wherein the calculation device calculates the travelable distance based on the measured remaining fuel amount value, instead of the recorded value, if the determination device determines that the variance value between the measured remaining fuel amount value and the recorded value is greater than the predetermined value.

A fifth aspect of the present invention is the travelable distance calculation apparatus according to the fourth aspect, wherein the predetermined value used by the determination device includes a first predetermined value used when the remaining fuel amount is larger than the recorded value, and a second predetermined value used when the remaining fuel amount is smaller than the recorded value, and the first predetermined value is a value higher than the second predetermined value.

A sixth aspect of the present invention is the travelable distance calculation apparatus according to the fourth or fifth aspect, further comprising a counting device that counts the number of times the determination device determines within a predetermined period of time that the variance value between the measured remaining fuel amount value and the recorded value is greater than the predetermined value, and a warning device that executes a warning when the number of times counted by the counting device reaches a predetermined number.

A seventh aspect of the present invention is the travelable distance calculation apparatus according to any one of the third to sixth aspects, wherein if the measured remaining fuel amount value measured by the measuring device is zero, the calculation means calculates the travelable distance based on the measured remaining fuel amount value instead of the recorded value.

Effects of the Invention

With the travelable distance calculation apparatus of the present invention described above, the value recorded during the operation of the engine is held as the recorded value during a period when the engine is stopped. Thus, fluctuations in the travelable distance associated with liquid surface oscillations of fuel are suppressed. Hence, the travelable distance can be appropriately calculated in order to display the travelable distance on the display means without giving the user a sense of incongruity.

If the remaining fuel amount sharply decreases, the travelable distance is calculated based on the measured remaining fuel amount instead of the recorded value, regardless of the operating state of the engine. Consequently, the travelable distance can be calculated more accurately and displayed.

MODE FOR CARRYING OUT THE INVENTION

An embodiment of the present invention will now be described in detail by reference to the accompanying drawings.

First of all, an explanation will be offered for an example of the configuration of a hybrid vehicle according to the present embodiment.

Figure 1:
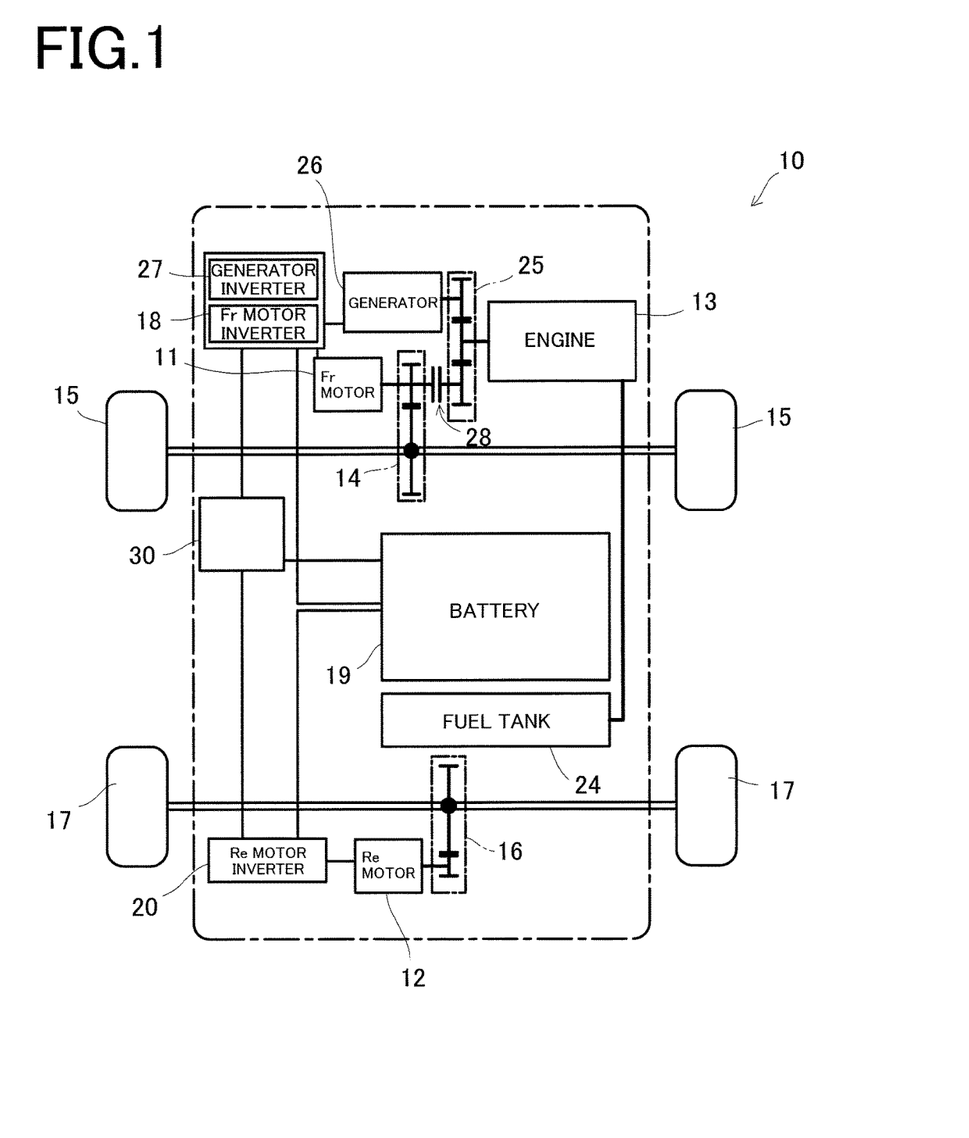
FIG. 1 is a schematic view showing an example of a hybrid vehicle according to the present invention.

As shown in FIG. 1, the hybrid vehicle (will hereinafter be referred to simply as "vehicle") 10 according to the present embodiment is equipped with a front motor 11, a rear motor 12, and an engine 13 as drive sources for traveling. The driving force of the front motor 11 is transmitted to front wheels 15 via a front drive transmission mechanism 14. The driving force of the rear motor 12 is transmitted to rear wheels 17 via a rear drive transmission mechanism 16. A battery 19 is connected to the front motor 11 via a front (Fr) motor inverter 18, and the battery 19 is connected to the rear motor 12 via a rear (Re) motor inverter 20. Electric power conformed to pedal operation by an occupant is supplied from the battery 9 to the motors 11, 12 via the inverters 18, 20.

The engine 13 is driven by the combustion of fuel supplied from a fuel tank 24. The engine 13 is connected to a generator 26 via an output system 25. The generator 26 is connected to the battery 19 (and front motor 11) via a generator inverter 27. The output system 25 is connected to the generator 26, and also connected to the front drive transmission mechanism 14 via a clutch 28.

When the engine 13 is driven depending on the operating state of the vehicle 10, the driving force of the engine 13 is first transmitted to the generator 26 via the output system 25. The generator 26 is actuated by the driving force of the engine 13, and electric power generated by the generator 26 is supplied, as appropriate, to the front motor 11 and the battery 19. When the clutch 28 is engaged depending on the operating state of the vehicle 10, moreover, the driving force of the engine 13 is transmitted to the front wheels 15 via the front drive transmission mechanism 14.

For the vehicle 10 according to the present embodiment, as noted above, any one of an EV travel mode, which is a first travel mode using the motors 11, 12 as a drive source, and a second travel mode using both of the motors 11, 12 and the engine 13 as a drive source is selected, as appropriate, depending on the operating state of the vehicle 10. The second travel mode, concretely, includes a series travel mode using the engine 13 as a source of electric power supply to the motors 11, 12, and a parallel travel mode for driving the wheels 15, 17 of the vehicle by the driving forces of both of the motors 11, 12 and the engine 13.

More concretely, with the EV travel mode as the first travel mode, fuel supply to the engine 13 is interrupted. Thus, the engine 13 is not driven, and the vehicle 10 is allowed to run by the driving force of the front motor 11 and the rear motor 12 alone.

The series travel mode, one of the forms of the second travel mode, allows the vehicle 10 to travel by the driving forces of the front motor 11 and the rear motor 12, as does the EV travel mode, but drives the engine 13 to supply electric power to the battery 19 (and front motor 11). As seen here, the series travel mode utilizes the engine 13 as an electric power supply source (generator). That is, with the series travel mode, the engine 13 is driven, but the clutch 28 is in a disengaged state. Thus, no power is transmitted between the output system 25 and the front drive transmission mechanism 14, with the result that the driving force of the engine 13 is transmitted only to the generator 26 via the output system 25.

With the parallel travel mode, the other form of the second travel mode, the vehicle 10 is made to run, with both of the motors 11, 12 and the engine 13 as the drive source. When, in a high speed travel or the like, an engine-based travel is more efficient than a motor-based travel, for example, the clutch 28 is engaged to transmit the driving force of the engine 13 to the front drive transmission mechanism 14. In other words, with the parallel travel mode, the vehicle 10 is allowed to run upon addition of the driving forces of the motors 11, 12 to the engine 13 (alternatively, by the driving force of the engine 13 alone).

The vehicle 10 is also provided with a control unit 30 for integrated control of various devices loaded on the vehicle 10. The control unit 30 grasps the operating state of the vehicle 10 based on signals from various sensors provided in the vehicle 10, and controls the various devices comprehensively based thereon. For example, the aforementioned selection of the travel mode conformed to the operating state of the vehicle 10 is also made by the control unit 30.

Figure 2:
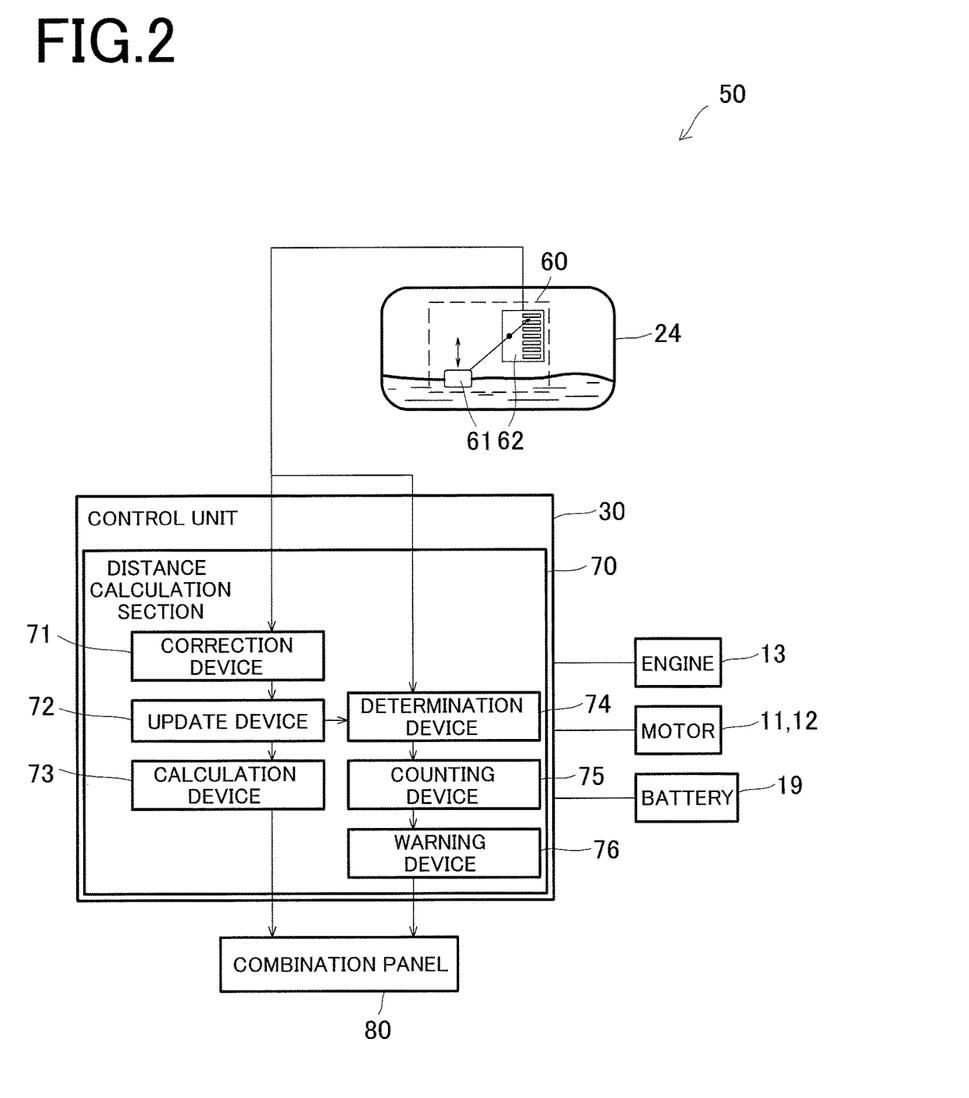
FIG. 2 is a block diagram showing a travelable distance calculation apparatus according to an embodiment of the present invention.

Next will be described a travelable distance calculation apparatus 50 according to the present invention which is loaded on the above-described hybrid vehicle 10. The travelable distance calculation apparatus 50 can also be called an operation support display apparatus which calculates a travelable distance appropriately and indicates it on a display device, thereby assisting in an operation by a driver. As shown in FIG. 2, the travelable distance calculation apparatus 50 is equipped with a fuel gauge 60 as a measuring device, a distance calculation section 70 provided in the control unit 30, and a combination panel 80 as the display device.

The fuel gauge 60 is provided in the fuel tank 24 for measuring the amount of remaining fuel (or remaining fuel amount) based on the position of the liquid surface of fuel.

As shown in FIG. 2, for example, the fuel gauge 60 is composed of a float 61 floated on the surface of fuel within the fuel tank 24, and a variable resistor portion 62 whose resistance value can vary in accordance with the upward or downward movement of the float 61. The fuel gauge 60 converts the resistance value of the variable resistor portion 62 into a remaining fuel amount (measured remaining fuel amount value) Q(n), and transmits it to the distance calculation section 70.

The distance calculation section 70 calculates the travelable distance of the vehicle 10 based on the remaining fuel amount measured by the fuel gauge 60. In the present embodiment, the calculation section 70 has a correction device 71, an update device 72, a calculation device 73, and a determination device 74.

The correction device 71 filters the remaining fuel amount (measured remaining fuel amount value) Q(n), measured by the fuel gauge 60, with the use of a high cut filter (low pass filter), for example, to calculate a corrected remaining fuel amount value Q'(n). The measured remaining fuel amount value Q(n) is transmitted from the fuel gauge 60 to the distance calculation section 70 at a predetermined timing (for example, at a constant time interval), and the correction device 71 calculates the corrected remaining fuel amount value Q'(n) each time the measured remaining fuel amount value Q(n) is transmitted.

The measured remaining fuel amount value Q(n) measured by the fuel gauge 60 fluctuates finely according to oscillations of the vehicle. Thus, the measured remaining fuel amount value Q(n) is smoothed by filtering to calculate the corrected remaining fuel amount value Q'(n). As will be described later, the corrected remaining fuel amount value Q'(n) is basically used as a basis for calculating the travelable distance of the vehicle 10. The filtering itself is an existing technique, and its explanation will be omitted herein.

The update device 72 records the corrected remaining fuel amount value Q'(n) calculated by the correction device 71, and sequentially updates the value K recorded (recorded value K). During a period when the engine 13 is operated, that is, in a case where the aforementioned second travel mode is selected, when the corrected remaining fuel amount value Q'(n) is newly calculated by the correction device 71, the update device 72 updates the previous value Q'(n−1), recorded as the recorded value K, to a new corrected remaining fuel amount value Q'(n). On the other hand, during a period when the engine 13 is stopped, that is, in a case where the aforementioned first travel mode is selected, the update device 72 holds a value Q'(x) recorded during the operation of the engine 13 (finally updated value Q'(x)) as the recorded value K. By this procedure, the travelable distance can be calculated appropriately in order to display the travelable distance on the combination panel 80 so that the user feels no sense of incongruity. Details will be offered later.

The calculation device 73, in normal operation, calculates the travelable distance of the vehicle 10 based on the remaining capacity of the battery 19, which supplies electric power to the front motor 11 and the rear motor 12 as the travel motors, and the recorded value K recorded by the update device 72. A method for calculating the travelable distance is not limited, but may be an existing method, so that its explanation will be omitted herein.

The determination device 74 determines whether or not the variance between the latest measured remaining fuel amount value Q(n) and the recorded value K is greater than a predetermined value D1. In other words, the determination device 74 determines whether or not the variance between the latest measured remaining fuel amount value Q(n) and the recorded value K is equal to or less than the predetermined value D1. By this step, the determination device 74 determines whether or not there has been an abrupt change (decrease) in the remaining fuel amount, for example, due to damage to the fuel tank 24. That is, if the variance between the latest measured remaining fuel amount value Q(n) and the recorded value K is equal to or less than the predetermined value D1, it is determined that there has been no abrupt change in the remaining fuel amount. If the above variance is greater than the D1, it is determined that an abrupt change has occurred in the remaining fuel amount.

The recorded value K, during the period of operation of the engine 13, is the corrected remaining fuel amount value Q'(n) obtained by filtering the latest measured remaining fuel amount value Q(n). During the period of stoppage of the engine 13, the recorded value K is the corrected remaining fuel amount value Q'(x) recorded during operation of the engine 13. Since the engine 13 is being stopped, however, this value Q'(x) and the latest corrected remaining fuel amount value Q'(n) substantially agree, in a normal state, for example, without damage to the fuel tank 24.

In the normal state, therefore, the variance value between the measured remaining fuel amount value Q(n) and the recorded value K, i.e. |Q(n)−K|, is equal to or less than the predetermined value D1, regardless of the operating state of the engine 13. In other words, the predetermined value D1 is set at a value, which is not exceeded by the variance value (|Q(n)−K|), in the normal state where no damage to the fuel tank 24 is present. For example, the predetermined value D1 is set at such a value as not to be exceeded by the variance value (|Q(n)−K|), even in a travel on an inclined road surface, during stoppage of the vehicle, or in a turning travel for a long time.

In the present embodiment, moreover, it is determined whether the variance value (|Q(n)−K|), the absolute value of the difference between the measured remaining fuel amount value Q(n) and the recorded value K, is equal to or less than the predetermined value D1. However, the predetermined value D1 may be a different value, depending on a case where the variance value (Q(n)−K) is positive and a case where the variance value (Q(n)−K) is negative. For example, a first predetermined value D1a which is used when the measured remaining fuel amount value Q(n) is higher than the recorded value K, and a second predetermined value D1b which is used when the measured remaining fuel amount value Q(n) is lower than the recorded value K, may be set, and the absolute values of the first predetermined value D1a and the second predetermined value D1b may be rendered different values. In the present embodiment, for example, the present determination is designed to determine mainly whether or not there is a decrease in fuel because of damage to the fuel tank 24. For this purpose, in setting the first predetermined value D1a and the second predetermined value D1b, it is preferred to set the first predetermined value D1a so that it is higher than the second predetermined value D1b. That is, it is preferred to set the first predetermined value D1a and the second predetermined value D1b so that the difference between the first predetermined value D1a and the recorded value K, i.e. (D1a−K), is greater than the difference between the second predetermined value D1b and the recorded value K, i.e. (K−D1b). By so doing, the presence or absence of a decrease in fuel, for example, due to damage to the fuel tank 24 can be determined earlier.

In normal operation as mentioned above, the calculation device 73 calculates the travelable distance of the vehicle 10 based on the remaining capacity of the battery 19 and the recorded value K. If it is determined by the determination device 74 that the variance value (|Q(n)−K|) between the measured remaining fuel amount value Q(n) and the recorded value K is higher than the predetermined value D1, on the other hand, the calculation device 73 calculates the travelable distance based on the latest measured remaining fuel amount value Q(n) instead of the recorded value K. That is, if it is determined by the determination device 74 that the variance value (|Q(n)−K|) is higher than the predetermined value D1, the travelable distance is calculated based on the latest measured remaining fuel amount value Q(n), in accordance with the judgment that damage to the fuel tank 24, for example, may have occurred.

The counting device 75 counts the number of times, N, the determination device 74 determines within a predetermined period of time, for example, within 30 seconds, that the variance value (|Q(n)−K|) is greater than the predetermined value D1. The warning device 76 executes a predetermined warning when the number of times N counted by the counting device 75 reaches a predetermined number (e.g. 3). For example, a judgment that damage or the like has occurred in the fuel tank 24 is made, and a warning to this effect is executed. The manner of warning is not limited and, for example, a warning light provided in the combination panel 80 may be blinked or illuminated. Alternatively, a warning sound may be issued.

The travelable distance calculation apparatus 50 according to the present invention, as described above, updates the recorded value K to the corrected remaining fuel amount value Q'(n) in the case of the second operation mode in which the engine 13 of the vehicle 10 is in operation; and holds the corrected remaining fuel amount value Q'(x) recorded during operation of the engine 13, without updating the recorded value K, in the case of an electrically operated travel during stoppage of the engine 13 (first travel mode). In this manner, fluctuations in the travelable distance calculated based on the recorded value K are suppressed. That is, fluctuations in the travelable distance associated with liquid surface oscillations of fuel are suppressed. Hence, the travelable distance can be appropriately calculated, and the travelable distance can be displayed on the combination panel 80, with no sense of incongruity being given to the user. For example, when the travelable distance is indicated relatively meticulously on the combination panel 80, indications of the travelable distance are apt to fluctuate markedly in association with the liquid surface oscillations. Even in this case, it is possible to indicate the travelable distance to such an extent that the user has no sense of incongruity.

If the remaining fuel amount sharply decreases, however, the calculation device 73 is adapted to calculate the travelable distance based on the measured remaining fuel amount value Q(n), which has been measured by the fuel gauge 60, instead of the recorded value K, no matter what the operating state of the engine 13 is. By so doing, the travelable distance can be indicated more accurately. Even when fuel has decreased, for example, because of damage done to the fuel tank 24, the travelable distance can be indicated relatively accurately.

Figure 3:
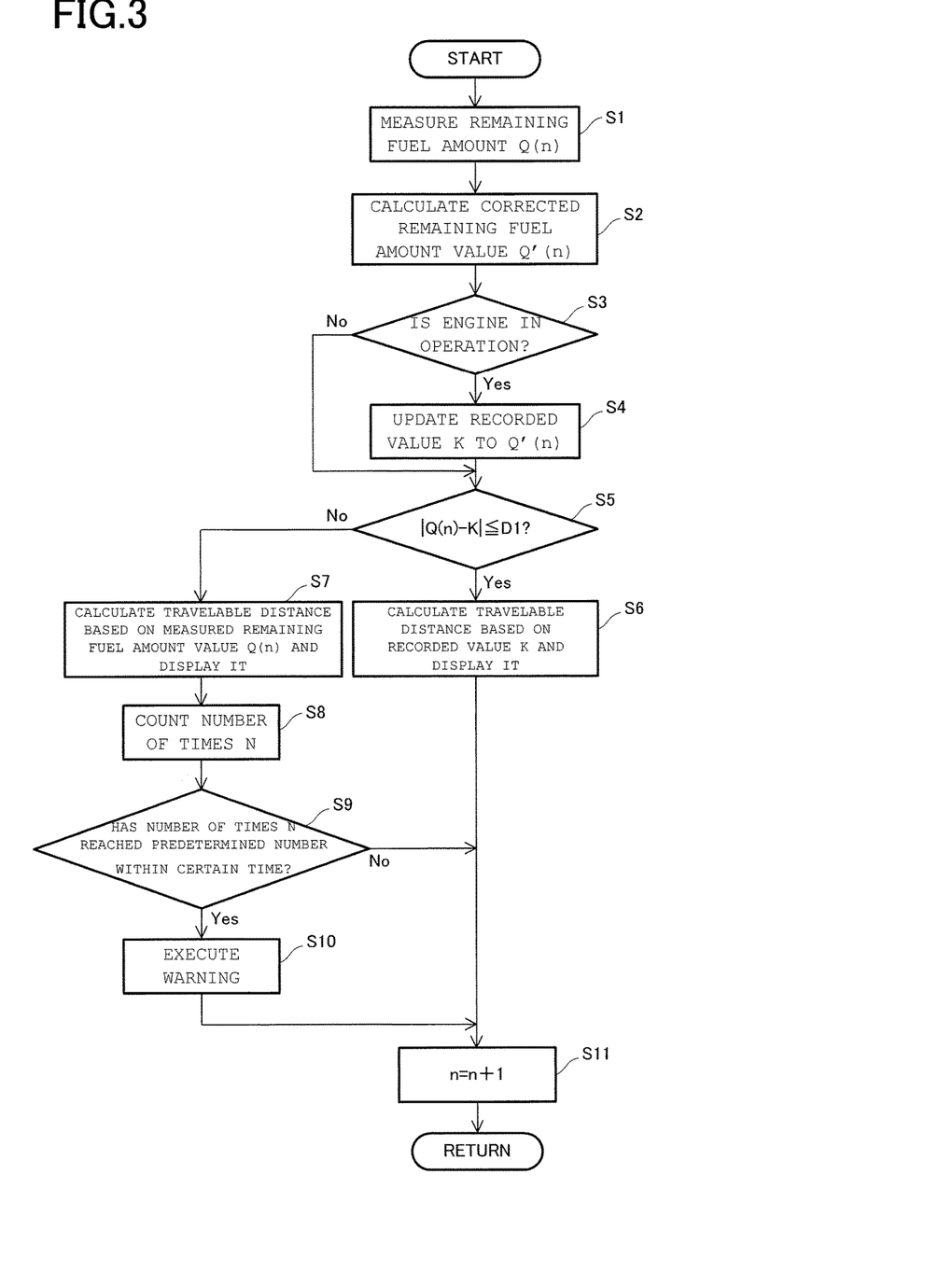
FIG. 3 is a flow chart showing an example of travelable distance calculation/display control by the travelable distance calculation apparatus according to the embodiment of the present invention.
Figure 4:
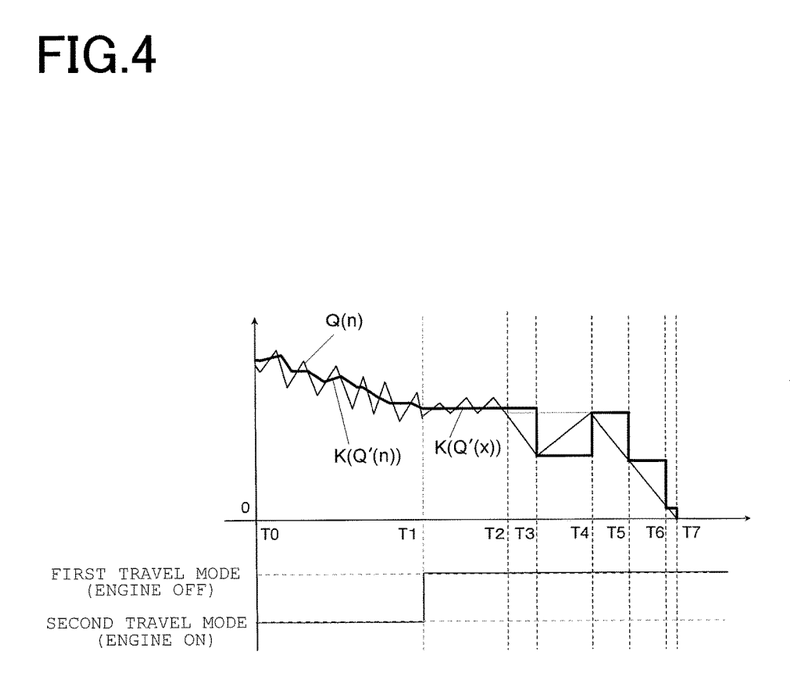
FIG. 4 is a graph showing an example of changes in measured remaining fuel amount values and recorded values.

An example of travelable distance calculation/display control in the travelable distance calculation apparatus 50 described above will be explained by reference to FIGS. 3 and 4. FIG. 3 is a flow chart showing the example of the travelable distance calculation/display control. FIG. 4 is a graph showing changes in the measured remaining fuel amount value Q(n) and the recorded value K.

As shown in FIG. 3, once calculation/display control over a travelable distance is started, the remaining amount of fuel within the fuel tank 24, i.e., (measured remaining fuel amount value) Q(n), is measured by the fuel gauge 60 (Step S1). Then, the measured remaining fuel amount value Q(n) is filtered by the correction device 71 to calculate a corrected remaining fuel amount value Q'(n) (Step S2). Then, it is determined whether the engine 13 is operated. If the engine is in operation (Step S3: Yes), the update device 72 records (updates) the corrected remaining fuel amount value Q'(n) as a recorded value K in Step S4, whereafter the program proceeds to Step S5. If the engine 13 is in the period of stoppage (Step S3: No), the recorded value K is not recorded (updated), but the program proceeds to Step S5.

The period from T0 to T1 in FIG. 4, for example, is the period during which the engine 13 is in operation (when the first operation mode is selected). During this period, fuel gradually decreases and, accordingly, the measured remaining fuel amount value Q(n) and the corrected remaining fuel amount value Q'(n) gradually decrease. During this period, the recorded value K is sequentially updated to the latest corrected remaining fuel amount value Q'(n), as stated earlier. The period after T1 in FIG. 4 is the period when the engine 13 is out of operation and, in a normal state (during the period from T1 to T2), the recorded value K is not subjected to recording (updating).

Returning to FIG. 3, it is determined by the determination device 74, in Step S5, whether the variance value (|Q(n)−K|) between the measured remaining fuel amount value Q(n) and the recorded value K is equal to or less than the predetermined value D1. That is, it is determined whether the variance value (| Q(n)−K|) between the measured remaining fuel amount value Q(n) and the recorded value K is higher than the predetermined value D1. If the variance between the measured remaining fuel amount value Q(n) and the recorded value K is equal to or less than the predetermined value D1 (Step S5: Yes), the program proceeds to Step S6, in which the calculation device 73 calculates the travelable distance based on the recorded value K (corrected remaining fuel amount value Q'(n)), and the calculated travelable distance is displayed on the combination panel 80. If the variance value (|Q(n)−K|) between the measured remaining fuel amount value Q(n) and the recorded value K is higher than the predetermined value D1 (Step S5: No), on the other hand, the program proceeds to Step S7. In Step S7, the calculation device 73 calculates the travelable distance based on the latest measured remaining fuel amount value Q(n), instead of the recorded value K, and the calculated travelable distance is displayed on the combination panel 80.

The period after T1 in FIG. 4, for example, is the period during which the engine 13 is stopped (when the second operation mode is selected). The period from T1 to T2 represents a normal state, concretely, a state in which the variance value (|Q(n)−K|) between the measured remaining fuel amount value Q(n) and the recorded value K is not higher than the predetermined value D1. Thus, the travelable distance is calculated based on the recorded value K (corrected remaining fuel amount value Q'(x)) and displayed on the combination panel 80. At timings T3, T4, T5 and T6, the measured remaining fuel amount value Q(n) sharply increases or decreases, with the result that the variance value (|Q(n)−K|) between the measured remaining fuel amount value Q(n) and the recorded value K is greater than the predetermined value D1. Because of this state, the travelable distance is calculated based on the latest measured remaining fuel amount value Q(n) and displayed on the combination panel 80.

With the travelable distance calculation apparatus 50 according to the present invention, as described above, in the case of the second operation mode in which the engine 13 of the vehicle 10 is in operation, the recorded value K is updated to the corrected remaining fuel amount value Q'(n) whereas in the case of the electrically operated travel (first travel mode) in which the engine 13 is stopped, the recorded value K is not updated, but the corrected remaining fuel amount value Q'(x) recorded during operation of the engine 13 is held. By this procedure, fluctuations in the travelable distance calculated based on the recorded value K are suppressed. That is, fluctuations in the travelable distance associated with liquid surface oscillations of fuel are suppressed. Hence, the travelable distance can be appropriately calculated, and the calculated travelable distance can be displayed on the combination panel 80, with no sense of incongruity being given to the user.

If the remaining fuel amount sharply decreases, however, the travelable distance is calculated based on the measured remaining fuel amount value Q(n), which has been measured by the fuel gauge 60, instead of the recorded value K, regardless of the operating state of the engine 13. By so doing, even when fuel has decreased, for example, because of damage to the fuel tank 24, the travelable distance can be calculated relatively accurately and displayed.

In the present embodiment, moreover, if the measured remaining fuel amount value Q(n) is found, by measurement using the fuel gauge 60, to be zero at a timing T7, the travelable distance of the vehicle 10 is calculated based on the measured remaining fuel amount value Q(n), instead of the recorded value K (corrected remaining fuel amount value Q'(x)), irrespective of the magnitude of the variance value (|Q(n)-K|) between the measured remaining fuel amount value Q(n) and the recorded value K. By so doing, changes in the travelable distance can be displayed more appropriately, with their differences over time being suppressed.

If the variance value (|Q(n)-K|) between the measured remaining fuel amount value Q(n) and the recorded value K is greater than the predetermined value D1 (Step S5: No), the travelable distance is displayed in Step S7. Then, in Step S8, the counting device 75 counts the number of times N it has been determined within a predetermined period of time, for example, within 30 seconds, that the variance value between the measured remaining fuel amount value Q(n) and the recorded value K is greater than the predetermined value D1. In Step S9, it is determined whether the number of times N has reached a predetermined number within the predetermined time (e.g., 3 within 30 seconds). This number of times N is reset at a point in time where the predetermined time has elapsed. When, at this time, the number of times N has reached the predetermined number (Step S9: Yes), the program proceeds to Step S10, in which a warning by the warning device 76 is executed. Then, in Step S11, the number of processings is set at n=n+1, and the program returns to Step S1 to repeat a series of processings. If, in Step S9, the number of times N has not reached the predetermined number (Step S9: No), the program proceeds to Step S11, without executing a warning.

In the example of FIG. 4, at timings T4 to T6, for example, the measured remaining fuel amount value Q(n) sharply decreases, so that the variance value (|Q(n)-K|) between the measured remaining fuel amount value Q(n) and the recorded value K becomes greater than the predetermined value D1, and the number of times N is counted at the timings T4, T5 and T6. In case the counting of the number of times N at each of the timings T4, T5 and T6 is performed within the predetermined time, a warning that damage to the fuel tank 24 or the like has occurred is issued to the user.

As noted above, when the number of times N that the variance value between the measured remaining fuel amount value Q(n) and the recorded value K is judged to be greater than the predetermined value D1 has reached the predetermined number within the predetermined time, a warning to the user is executed. By this measure, the user can be appropriately informed of a decrease in fuel associated with damage to the fuel tank or the like.

Although the one embodiment of the present invention has been described above, it is to be noted that the present invention is in no way limited to the foregoing embodiment.

In the above embodiment, for example, the example of displaying the travelable distance of the vehicle based on the remaining amount of fuel within the fuel tank has been described as the operation support display apparatus. However, for example, the remaining fuel amount itself may be displayed together with the travelable distance.

In the above embodiment, moreover, the corrected remaining fuel amount value Q'(n) is calculated by correcting (filtering) the measured remaining fuel amount value Q(n) measured by the fuel gauge 60. Basically, the travelable distance is calculated based on this corrected remaining fuel amount value Q'(n). However, the corrected remaining fuel amount value Q'(n) need not necessarily be calculated, but the travelable distance may be calculated based on the measured remaining fuel amount value Q(n). That is, the update device 72 may record the measured remaining fuel amount value Q(n) measured by the fuel gauge 60, and may sequentially update the value K recorded (recorded value K).

Concretely, during the period of operation of the engine 13, when the measured remaining fuel amount value Q(n) is newly measured by the fuel gauge 60, the update device 72 updates the previous value Q(n-1), recorded as the recorded value K, to the new measured remaining fuel amount value Q(n). During the period when the engine 13 is stopped, on the other hand, the update device 72 holds the value recorded during the operation of the engine 13, i.e. finally updated value, Q(x), as the recorded value K.

Even in the above-described configuration, fluctuations in the travelable distance associated with liquid surface oscillations of fuel are suppressed. Hence, the travelable distance can be displayed on the combination panel 80, without sense of incongruity being given to the user.

EXPLANATIONS OF LETTERS OR NUMERALS

10 Hybrid vehicle
11 Front motor
12 Rear motor
13 Engine
14 Front drive transmission mechanism
15 Front wheel
16 Rear drive transmission mechanism
17 Rear wheel
18 Front motor inverter
19 Battery
20 Rear motor inverter
24 Fuel tank
25 Output system
26 Generator
27 Generator inverter 28 Clutch
30 Control unit
50 Travelable distance calculation apparatus
60 Fuel gauge
61 Float
62 Variable resistor portion
70 Distance calculation section
71 Correction device
72 Update device
73 Calculation device
74 Determination device
75 Counting device
76 Warning device
80 Combination panel (display device)

The invention claimed is:

1. A travelable distance calculation apparatus for a hybrid vehicle equipped with a travel motor, an engine, and a battery for supplying electric power to the travel motor, the travelable distance calculation apparatus comprising:
a device configured to measure a remaining fuel amount based on a position of a liquid surface of fuel within a fuel tank provided in the hybrid vehicle;
a device configured to record the remaining fuel amount measured by the measuring device, and also configured to sequentially update a recorded value thereof;
a device configured to calculate a travelable distance based on a remaining capacity of the battery and the recorded value;
a device configured to display the travelable distance calculated by the calculation device;
a device configured to calculate a corrected remaining fuel amount value by filtering a measured remaining fuel amount value which is the remaining fuel amount measured by the measuring device; and
a device configured to determine whether or not a variance value between the measured remaining fuel amount value and the recorded value is greater than a predetermined value, during a period when the engine is stopped,
wherein the update device
records the corrected remaining fuel amount value as the remaining fuel amount, sequentially updates the recorded value, and holds a value updated finally during operation of the engine, as the recorded value, during the period when the engine is stopped, wherein
when a travel mode of the hybrid vehicle is an EV travel mode in which the engine is not driven and the hybrid vehicle is allowed to run by driving force of the travel motor,
the calculation device
calculates the travelable distance based on the recorded value if the determination device determines that the variance value between the measured remaining fuel amount value and the recorded value is equal to or less than the predetermined value, and
calculates the travelable distance based on the measured remaining fuel amount value, instead of the recorded value, if the determination device determines that the variance value between the measured remaining fuel amount value and the recorded value is greater than the predetermined value.

2. The travelable distance calculation apparatus according to claim 1, wherein the display device
displays the recorded value as the remaining fuel amount, together with the travelable distance, and
displays the value updated finally, as the remaining fuel amount, during the period when the engine is stopped.

3. The travelable distance calculation apparatus according to claim 2, wherein
the predetermined value used by the determination device includes a first predetermined value used when the remaining fuel amount is larger than the recorded value, and a second predetermined value used when the remaining fuel amount is smaller than the recorded value, and
the first predetermined value is a value higher than the second predetermined value.

4. The travelable distance calculation apparatus according to claim 3, further comprising
a device configured to count a number of times the determination device determines within a predetermined period of time that the variance value between the measured remaining fuel amount value and the recorded value is greater than the predetermined value, and
a device configured to execute a warning when the number of times counted by the counting device reaches a predetermined number.

5. The travelable distance calculation apparatus according to claim 4, wherein
if the measured remaining fuel amount value measured by the measuring device is zero, the calculation device calculates the travelable distance based on the measured remaining fuel amount value instead of the recorded value.

6. The travelable distance calculation apparatus according to claim 2, further comprising
a device configured to count a number of times the determination device determines within a predetermined period of time that the variance value between the measured remaining fuel amount value and the recorded value is greater than the predetermined value, and
a device configured to execute a warning when the number of times counted by the counting device reaches a predetermined number.

7. The travelable distance calculation apparatus according to claim 6, wherein
if the measured remaining fuel amount value measured by the measuring device is zero, the calculation device calculates the travelable distance based on the measured remaining fuel amount value instead of the recorded value.

8. The travelable distance calculation apparatus according to claim 2, wherein
if the measured remaining fuel amount value measured by the measuring device is zero, the calculation device calculates the travelable distance based on the measured remaining fuel amount value instead of the recorded value.

9. The travelable distance calculation apparatus according to claim 3, wherein
if the measured remaining fuel amount value measured by the measuring device is zero, the calculation device calculates the travelable distance based on the measured remaining fuel amount value instead of the recorded value.

10. The travelable distance calculation apparatus according to claim 1, further comprising
a device configured to count a number of times the determination device determines within a predetermined period of time that the variance value between the measured remaining fuel amount value and the recorded value is greater than the predetermined value, and a device configured to execute a warning when the number of times counted by the counting device reaches a predetermined number.

11. The travelable distance calculation apparatus according to claim 10, wherein if the measured remaining fuel amount value measured by the measuring means is zero, the calculation device calculates the travelable distance based on the measured remaining fuel amount value instead of the recorded value.

12. The travelable distance calculation apparatus according to claim 1, wherein if the measured remaining fuel amount value measured by the measuring device is zero, the calculation device calculates the travelable distance based on the measured remaining fuel amount value instead of the recorded value.

13. A travelable distance calculation apparatus for a hybrid vehicle equipped with a travel motor, an engine, and a battery for supplying electric power to the travel motor, the travelable distance calculation apparatus comprising:

a device configured to measure a remaining fuel amount based on a position of a liquid surface of fuel within a fuel tank provided in the hybrid vehicle;

a device configured to record the remaining fuel amount measured by the measuring device, and also configured to sequentially update a recorded value thereof;

a device configured to calculate a travelable distance based on a remaining capacity of the battery and the recorded value;

a device configured to display the travelable distance calculated by the calculation device;

a device configured to calculate a corrected remaining fuel amount value by filtering a measured remaining fuel amount value which is the remaining fuel amount measured by the measuring device; and a device configured to determine whether or not a variance value between the measured remaining fuel amount value and the recorded value is greater than a predetermined value, during a period when the engine is stopped, wherein the update device records the corrected remaining fuel amount value as the remaining fuel amount, sequentially updates the recorded value, and holds a value updated finally during operation of the engine, as the recorded value, during the period when the engine is stopped, wherein the calculation device calculates the travelable distance based on the measured remaining fuel amount value, instead of the recorded value, if the determination device determines that the variance value between the measured remaining fuel amount value and the recorded value is greater than the predetermined value, and the predetermined value used by the determination device includes a first predetermined value used when the remaining fuel amount is larger than the recorded value, and a second predetermined value used when the remaining fuel amount is smaller than the recorded value, and the first predetermined value is a value higher than the second predetermined value.

14. The travelable distance calculation apparatus according to claim 13, further comprising a device configured to count a number of times the determination device determines within a predetermined period of time that the variance value between the measured remaining fuel amount value and the recorded value is greater than the predetermined value, and a device configured to execute a warning when the number of times counted by the counting device reaches a predetermined number.

15. The travelable distance calculation apparatus according to claim 14, wherein if the measured remaining fuel amount value measured by the measuring device is zero, the calculation device calculates the travelable distance based on the measured remaining fuel amount value instead of the recorded value.

16. The travelable distance calculation apparatus according to claim 13, wherein if the measured remaining fuel amount value measured by the measuring device is zero, the calculation device calculates the travelable distance based on the measured remaining fuel amount value instead of the recorded value.

* * * * *